United States Patent
Nolte et al.

(10) Patent No.: US 11,936,649 B2
(45) Date of Patent: Mar. 19, 2024

(54) MULTI-FACTOR AUTHENTICATION

(71) Applicant: ENTERSEKT INTERNATIONAL LIMITED, Ebene (MU)

(72) Inventors: Dewald de Ridder Nolte, Stellenbosch (ZA); Gerhard Gysbert Oosthuizen, Stellenbosch (ZA)

(73) Assignee: ENTERSEKT INTERNATIONAL LIMITED, Ebune (MU)

( * ) Notice: Subject to any disclaimer, the term of this patent is extended or adjusted under 35 U.S.C. 154(b) by 174 days.

(21) Appl. No.: 17/452,048

(22) Filed: Oct. 22, 2021

(65) Prior Publication Data
US 2022/0131857 A1    Apr. 28, 2022

(30) Foreign Application Priority Data
Oct. 26, 2020 (ZA) .................................. 2020/06631

(51) Int. Cl.
| | |
|---|---|
| *H04L 9/40* | (2022.01) |
| *H04L 9/08* | (2006.01) |
| *H04L 9/32* | (2006.01) |

(52) U.S. Cl.
CPC ........ *H04L 63/0861* (2013.01); *H04L 9/0894* (2013.01); *H04L 9/3263* (2013.01); *H04L 9/3271* (2013.01); *H04L 63/0823* (2013.01); *H04L 2463/082* (2013.01)

(58) Field of Classification Search
None
See application file for complete search history.

(56) References Cited

U.S. PATENT DOCUMENTS

| | | | |
|---|---|---|---|
| 9,301,140 B1 | 3/2016 | Costigan et al. | |
| 10,609,070 B1* | 3/2020 | Farmer, III | ........... H04L 63/126 |
| 10,824,702 B1* | 11/2020 | Shahidzadeh | ......... G06F 21/604 |
| 2014/0096215 A1* | 4/2014 | Hessler | ................. H04W 12/06 |
| | | | 726/7 |
| 2018/0183586 A1* | 6/2018 | Bhargav-Spantzel | ....................... |
| | | | G06F 21/32 |
| 2018/0270065 A1* | 9/2018 | Brown | .................. H04L 9/0861 |
| 2019/0386957 A1* | 12/2019 | Leon | ...................... H04L 63/18 |

(Continued)

OTHER PUBLICATIONS

OneSpan, "Behavioral Biometrics: Frictionless Security in the Fight Against Fraud"; 2019.

*Primary Examiner* — Brandon Hoffman
(74) *Attorney, Agent, or Firm* — Knobbe, Martens, Olson & Bear, LLP

(57) ABSTRACT

Systems and methods for multi-factor authentication are based on validation of an inherence factor and a possession factor obtained in a "frictionless" or almost frictionless manner. A method conducted at a software application executing on a user device associated with a user and connected to a server computer, includes obtaining signing or encryption of a set of data elements using a cryptographic key securely stored for exclusive use by the software application and transmitting the signed or encrypted data elements to the server computer. The method includes transmitting, to the server computer, a payload including contextual data which includes behavioural data collected via one or more contextual data sources. The signed data elements represent a possession factor and the payload including contextual data represents an inherence factor for validation and multi-factor authentication by the server computer.

19 Claims, 9 Drawing Sheets

(56) References Cited

U.S. PATENT DOCUMENTS

2019/0386981 A1* 12/2019 Ramesh Kumar .... H04L 9/3228
2022/0256341 A1* 8/2022 Puri ................... G06F 21/6245

* cited by examiner

MULTI-FACTOR AUTHENTICATION

CROSS-REFERENCE TO RELATED APPLICATIONS

This application claims priority from South African provisional patent application number 2020/06631, which is incorporated by reference herein.

FIELD OF THE INVENTION

This invention relates to multi-factor authentication, such as for, but not necessarily limited to, the purpose of user or transaction authentication.

BACKGROUND TO THE INVENTION

Transactions of various types are carried out by users daily and often require a user to access information which is sensitive to the user. For example, if a user wishes to make payments it is often required of the user to access their bank account using a software application installed on a user device.

Due to the sensitivity of the information, a user may be required to authenticate himself/herself in order to prevent unauthorised access to the sensitive information of the user. For example, authentication may be required to prevent miscreants from illegitimately authorising payments or gaining access to a legitimate user's account without the knowledge of the user.

A well-known form of authentication is multi-factor authentication which combines at least two independent credentials, generally referred to as authentication factors, to verify the identity of the user. By requiring at least two factors to authorise a transaction a more layered form of defence is implemented, making it more difficult for illegitimate users to gain access to a legitimate user's account.

In a typical case a user would be required to provide as one factor a username and password (referred to as a knowledge factor), and as a second factor a fingerprint of the user (referred to as an inherence factor) or a one-time pin sent to a device associated with the user (referred to as a possession factor) in order to authenticate a transaction.

While this multi-layered form of security has greatly reduced fraudulent activity and transactions, it often leads to a more tedious user experience in making payments or accessing user accounts. Accordingly, there is scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a computer implemented method for multi-factor authentication conducted at a software application executing on a user device associated with a user and connected to a server computer, the method comprising:
  obtaining signing or encryption of a set of data elements using a cryptographic key securely stored for exclusive use by the software application and transmitting the signed or encrypted data elements to the server computer; and,
  transmitting, to the server computer, a payload including contextual data which includes behavioural data collected via one or more contextual data sources,
  wherein the signed data elements represent a possession factor and the payload including contextual data represents an inherence factor for validation and multi-factor authentication by the server computer.

A further feature provides for the method to include collecting the contextual data by the software application during defined or routine tasks carried out at the user device during an interaction with the server computer.

Further features provide for the software application to access contextual data sources of the user device; and for the contextual data sources to include one or more input interfaces.

A further feature provides for the cryptographic key to be securely stored in a secure portion of a memory of the user device which provides secure storage for the software application by protecting the secure portion An even further feature provides for the signed or encrypted set of data elements to include the payload and for transmitting the payload to the server computer to include transmitting the signed or encrypted set of data elements including the payload to the server computer.

Further features provide for the method to include receiving a challenge from the server computer in response to the software application connecting to the server computer; and for one or both of the set of data elements and the payload to include the challenge.

A further feature provides for the method to include receiving transaction information relating to a transaction and including the transaction information in one or both of the set of data elements and the payload.

Further features provide for the cryptographic key to be securely stored for exclusive use by the software application while the software application is connected to the server computer; for the cryptographic key to be generated by the software application and uniquely associated with the software application; and for the cryptographic key to be a private key having a corresponding public key accessible to the server computer, wherein the private key is associated with a digital certificate including the public key, and wherein the digital certificate includes a unique identifier and is enrolled at the server computer in association with the user.

Further features provide for the signed or encrypted data elements and the payload to be transmitted to the server computer without user intervention.

Further features provide for the method to include receiving transaction information relating to a transaction and including the transaction information in the payload.

Further features provide for the method to include obtaining signing or encryption of the payload using the private key.

A further feature provides for one or both of transmitting the signed or encrypted data elements and transmitting the payload to include transmitting the signed data elements or the payload, as the case may be, to the server computer together with the digital certificate.

Further features provide for the method to include continually collecting contextual data for periodically compiling into additional payloads; for the contextual data to include one or both of behavioural data and environmental data; and for the behavioural data to be collected via the one or more input interfaces.

In accordance with a further aspect of the invention there is provided a computer implemented method for multi-factor authentication conducted at a server computer connected to a software application executing on a user device, the method comprising:
- receiving, from the software application, signed or encrypted data elements, the signed or encrypted data elements representing a possession factor and having been obtained by the software application using a cryptographic key securely stored for exclusive use by the software application;
- receiving a payload including contextual data which includes behavioural data, the behavioural data having been collected by the software application and representing an inherence factor;
- validating the possession factor including validating the signed or encrypted data elements using a corresponding cryptographic key associated with the software application; and,
- validating the inherence factor including validating the contextual data against a user profile associated with the software application.

Further features provide for the method to include storing raw or processed contextual data in a user profile associated with a software application instance at a user device; and for validating the contextual data to include comparing received contextual data to the stored raw or processed contextual data.

A further feature provides for the method to include updating the raw and/or processed contextual data in a user profile with received contextual data that is validated against the user profile.

An even further feature provides for validating the contextual data against a user profile to include providing a session trust score indicating the extent to which the received contextual data indicates that the user interacting with the software application is an enrolled user.

In accordance with a further aspect of the invention there is provided a system for multi-factor authentication including a software application executing on a user device associated with a user and connectable to a server computer, the user device having a memory for storing computer-readable program code and a processor for executing the computer-readable program code, the user device comprising:
- a signature/encryption obtaining component for obtaining signing or encryption of a set of data elements using a cryptographic key securely stored for exclusive use by the software application and transmitting the signed or encrypted data elements to the server computer; and,
- a payload transmitting component for transmitting, to the server computer, a payload including contextual data which includes behavioural data collected via one or more input interfaces,
- wherein the signed data elements represent a possession factor and the payload including contextual data represents an inherence factor for validation and multi-factor authentication of the user by the server computer.

In accordance with a further aspect of the invention there is provided a system for multi-factor authentication including a server computer connectable to a software application executing on a user device, the server computer having a memory for storing computer-readable program code and a processor for executing the computer-readable program code, the server computer comprising:
- a signed or encrypted data elements receiving component for receiving, from the software application, signed or encrypted data elements, the signed or encrypted data elements representing a possession factor and having been obtained by the software application using a cryptographic key securely stored for exclusive use by the software application;
- a payload receiving component for receiving a payload including contextual data which includes behavioural data, the behavioural data having been collected by the software application and representing an inherence factor;
- a possession factor validating component for validating the possession factor including validating the signed or encrypted data elements using a corresponding cryptographic key associated with the software application; and,
- an inherence factor validating component for validating the inherence factor including validating the contextual data against a user profile associated with the software application.

A further feature provides for the user device to include a payload compiling component for compiling a payload including the contextual data collected by the software application from one or more contextual data sources including an input interface of the user device during defined or routine tasks carried out at the user device during an interaction with the server computer.

An even further feature provides for the cryptographic key to be securely stored in a secure portion of a memory of the user device which provides secure storage for the software application by protecting the secure portion from access by other applications executing on the user device and from external access.

In accordance with an aspect of the invention there is provided a computer program product for multi-factor authentication, the computer program product comprising a computer-readable medium having stored computer-readable program code for performing the steps of:
- obtaining signing of a set of data elements using a private key securely stored for exclusive use by a software application and transmitting the signed data elements to a server computer; and,
- transmitting, to the server computer, a payload including contextual data which includes behavioural data collected via one or more input interfaces,
- wherein the signed data elements represent a possession factor and the payload including contextual data represents an inherence factor for validation and multi-factor authentication of the user by the server computer.

In accordance with an aspect of the invention there is provided a computer program product for multi-factor authentication, the computer program product comprising a computer-readable medium having stored computer-readable program code for performing the steps of:
- receiving, from a software application, signed or encrypted data elements, the signed or encrypted data elements representing a possession factor and having been obtained by the software application using a cryptographic key securely stored for exclusive use by the software application;
- receiving a payload including contextual data which includes behavioural data, the behavioural data having been collected by the software application and representing an inherence factor;
- validating the possession factor including validating the signed or encrypted data elements using a corresponding cryptographic key associated with the software application; and, validating the inherence factor including validating the contextual data against a user profile associated with the software application.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

Figure 1:
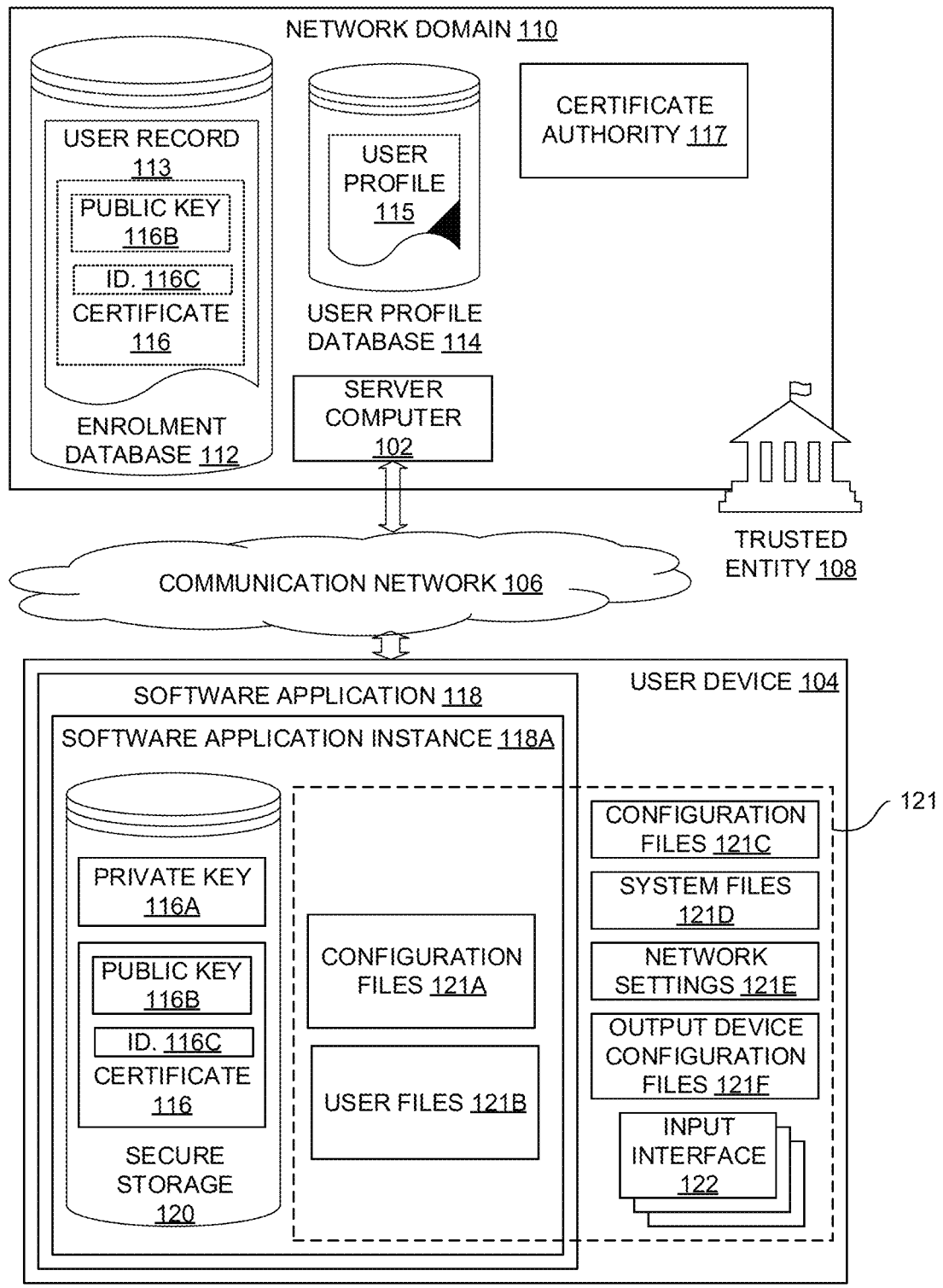
FIG. 1 is a schematic diagram which illustrates an exemplary embodiment of a system for multi-factor authentication in accordance with aspects of the present disclosure.

Aspects of this disclosure are directed towards systems and methods for multi-factor authentication. The multi-factor authentication may be based on validation of an inherence factor ("something I am") and a possession factor ("something I have"). An inherence factor may be one or more elements that are integral to the user, A possession factor may be one or more elements that show possession of something by the user. As will be elaborated on in greater detail below, each of the inherence factor and the possession factor may be obtained in a "frictionless" or almost frictionless manner in that the user in respect of which the authentication relates is not directly prompted for, and does not necessarily knowingly provide, input of either of these factors. The multi-factor authentication according to the systems and methods described herein may therefore occur, from the perspective of the user, in the background and hence without direct knowledge or intervention on the part of the user. The security provided by the multi-factor authentication described herein may for example be sufficient to meet the requirements of strong consumer authentication (SCA) as defined in the Revised Payment Services Directive ("PSD2").

The systems and methods described herein may provide multi-factor authentication of actions, instructions or requests submitted by a user to a server computer via an endpoint (such as a user device) connected to the server computer via a suitable communication network. The user device may have a software application resident therein and installed and executable thereon which is configured to submit the inherence and possession factors or claims to the server computer.

Aspects of the present disclosure are directed towards embodiments in which the software application is a web browser and towards embodiments in which the software application is a customized "native" software application downloadable from an application repository (or otherwise installable on the user device) and configured to perform a set of specific functions (e.g. a banking application, a personal finance application or any other application which connects to a remote server for the purpose of interacting with accounts or records personal and/or private to the user thereof).

The software application collects contextual data, which includes behavioral data and, optionally, environmental data and transmits this to the server computer, typically via one or more payloads. Contextual data is defined as data depending on or relating to the circumstances that form a setting for an event such as a particular situation or stimulus. Behavioral data is defined as data relating to the way in which a user acts in response to a particular situation or stimulus. Environmental data is defined as data relating to the user's surroundings at a particular time or when a user is responding to a particular situation or stimulus. The term "payload" is used to define the data that is to be transmitted for use at the server computer, which may be incorporated into a message or other form for transmittal.

The behavioral data may be collected while the user performs an action that he or she is routinely or often required to perform when interacting with the server (e.g. entering user name and/or password, completing a CAPTCHA test, completing a customer satisfaction survey, adding a payment beneficiary, paying a pre-loaded beneficiary, making a payment, entering payment card details, entering an OTP, and the like). The contextual data (and more specifically, the behavioral data) constitutes the inherence factor or inherence claim that is submitted to the server computer for validation. Collecting behavioral data during routine actions or tasks performed by the user may facilitate in collection of data on which to train algorithms and may improve the performance in discerning between the behavioral characteristics of different individuals.

The software application also signs or encrypts data elements using a cryptographic key that is securely stored for exclusive use by the software application (and in some implementations only while connected to the server computer). The signed or encrypted data elements are transmitted to the server computer and constitute the possession claim or possession factor for validation by the server computer (by virtue of the fact that they have been signed/encrypted using a cryptographic key to which only the software application instance, and thus the user of the user device, has access).

In some embodiments, the data elements include a challenge received from the server computer, in which case the signed or encrypted data elements submitted to the server computer may constitute a challenge-response. In some embodiments, the data elements include a payload including the contextual data. In some embodiments, the data elements include transaction information associated with a transaction to which the authentication relates. The data elements may therefore include one or more of: a challenge received from the server computer, a payload including contextual data, and transaction information. The data elements may be signed or encrypted and transmitted to the server computer as a single message, or may be signed or encrypted and transmitted to the server computer in a series of messages (e.g. firstly the signed/encrypted challenge, then the signed/encrypted payload, then the signed/encrypted transaction information, or any other suitable combination).

Further aspects of this disclosure provide for the server computer to store and maintain a user profile which includes raw or processed contextual data for the user compared to which received user contextual data may be validated. The user profile contextual data may be used to determine a user trust score when compared to received user contextual data. Maintaining the user profile may include the server computer validating the contextual data against the user profile and updating the user profile to include data elements which meet a required trust score and can be considered "trusted data". These steps may repeat as required to allow the server computer to build a user profile for validation of inherence claims submitted by the software application and purporting to relate to behavioral data associated with the user linked to the user profile.

FIG. 1 is a schematic diagram which illustrates an exemplary system (100) system for multi-factor authentication according to aspects of the present disclosure. Various combinations of the described features and aspects may be used in a given implementation.

The system may include a server computer (102) and a user device (104) in data communication with each other via an appropriate communication network (106), such as the Internet or other suitable public communication network. It should be appreciated that even though only a single user device (104) is shown, a plurality of user devices may be present in a practical implementation. The user device (104) is associated with a user and the server computer (102) is associated with a trusted entity (108). In some cases, each user may have a plurality of user devices associated therewith. The user may be registered with the trusted entity and the user device (104), or a software application (118) installed thereon, may be registered or enrolled with the server computer (102).

The server computer (102) may be maintained or operated by the trusted entity (108), which may be a financial institution, providing a service to a user, or an authentication service provider providing authentication services to other entities. The server computer (102) may be any suitable computing device configured to perform the role of a server such as a server cluster, a distributed server, a cloud-based server or the like.

The server computer (102) may form part of a network domain (110) which may be identifiable via a domain name. The domain name may be a globally unique name assigned to the network domain within a Domain Name System (DNS) for use in accessing the network domain (and the server computer) via the communication network (106).

The server computer (102) may have access to and may maintain an enrolment database (112) in which a user record (113) associated with the user is stored. The user record may include one or more of: a user identifier which uniquely identifies the user; an application instance identifier which uniquely identifies the instance of the software application (118) installed on the user device and enrolled in association with the user; challenge information (such as a seed value, counter, etc.); an interaction data element and/or a list of previously used interaction data elements having been transmitted to and stored by the software application during previous connections/sessions with the secure server; cryptographic key(s) (such as one or more symmetric keys and/or one or more public keys) associated with the software application instance; a digital certificate associated with the software application instance; and, a digital certificate identifier which is uniquely associated with a digital certificate associated with the software application instance. In cases where the user is associated with a plurality of software application instances, the user record may store one or more of: an application instance identifier; challenge information; interaction data elements; cryptographic key(s); a digital certificate; and, a digital certificate identifier associated with each of the registered/enrolled software instances.

The server computer may have access to and may maintain a user profile database (114) in which a user profile (115) may be stored and maintained. The user profile may be associated with a user identifier and may store one or more of: raw and/or processed contextual data points; patterns, discriminators, flags and other metadata derived from raw and/or processed contextual data points; scores, rules and/or thresholds associated with the patterns and/or contextual data points, and the like.

The server computer may have access to or may provide a certificate authority (CA) (117). The CA (117) may form part of the server computer (102) or may be provided or hosted by an independent third party which is trusted by the entity (108) and other entities. In some implementations, the CA may implement closed PKI (public key infrastructure) in terms of which proprietary PKI software issues digital certificates to a limited, controlled community of users (e.g. users registered with the trusted entity). In such an implementation, root certificates are not available to browsers or other applications. This is different from a CA implementing open PKI in terms of which applications can interface seamlessly with certificates issued under an open PKI, the roots of which are already embedded. In other implementations, the CA may however implement open PKI. In some implementations, the server uses the same CA (117) for its PKI operations (e.g. secure connections) used by the software application on the user device.

The CA (117) may be configured to generate, sign, provision, and/or issue digital certificates to software application instances. Such digital certificates may be X.509 certificates and may include a digital certificate identifier, which may for example be generated and/or signed by the CA and uniquely associated with the digital certificate (and hence the software application instance too). The digital certificate identifier may be a globally unique identifier.

The user device (104) may be any suitable computing device under the control of the user, such as a mobile phone (or smart phone), tablet computer, wearable computing device, personal digital assistant, laptop computer, an in-vehicle infotainment/in-car entertainment system, smart appliance, smart speaker or other virtual digital assistant or the like.

The user device (104) has a software application (118) resident therein and installed and executable thereon. The specific instance of the software application installed or otherwise resident on this particular user's user device may be enrolled or registered with the server computer and trusted entity in association with the user. In other words, the software application instance is linked to the user by the server computer (e.g. by virtue or the user record stored in the enrolment database).

In some cases, the software application may be a native software application developed by the trusted entity to perform a set of specific functions (e.g. a banking application, or the like). In some cases, the software application may be a web browser provided by a third-party web browser developer (such as one of the Chrome™, Safari™, Firefox™ or Edge™ web browsers, each of which is a trademark of its respective proprietor). In some cases, the software application may be a native application developed by a third party and including a software-development kit (SDK) developed, maintained and/or controlled by the trusted entity.

The terms "software application instance", "software instance", or simply "instance" (118A) are used herein to refer to the particular case or occurrence of the software application installed on the user device and to distinguish this from other occurrences of the software application installed on the user device and/or from other occurrences of the software application installed on other users' devices. In other words, the software application instance on the user device is a particular, and unique, occurrence of the software application. In some cases, the software application may have multiple instances on the user device (e.g. in the case of the software application being a web browser). In some cases, the software application has only one instance on the user device. The software application instance may be associated with an application instance identifier which uniquely identifies the software application instance. In some cases, the same user device may have more than one software application installed thereon and enrolled with the server computer.

The software application (118) has access to a secure portion of user device memory which provides secure storage (120) for the software application instance (118A). The storage may be secure in that it is protected, by way of software and/or hardware configuration, from access by other applications executing on the user device, by other instances of the software application (118) and/or from external access. The secure storage may therefore be for the exclusive use of the software application instance (118A) such that data stored in the secure storage by the software application instance (118A) is protected from access and/or interference by other applications, instances, devices and/or third parties. In cases where the software application is a web browser, the secure storage may be provided by an Indexed DB functionality of the web browser (i.e. as provided by the Indexed Database API, which defines an API for a database of records holding simple values and hierarchical objects with each record having a key and some value). In some cases, the secure storage may be provided by a secure element or other hardware security module accessible to the user device. The software application instance (118A) may store one or more of: cryptographic key(s), a digital certificate, an application instance identifier; an interaction data element having been received from the server computer in a previous connection; and optionally other sensitive or security-related data. The cryptographic key(s) may therefore be stored for exclusive use by the software application instance.

In some implementations the software application (118) may be configured to generate or obtain its own cryptographic key(s) (such as a public-private keypair, or a symmetric key) and/or a digital certificate (116). This may occur the first time the software application is installed on the user device (104) or the first time the software application instance (118A) connects to the server computer via the communication network (106). Generating the cryptographic key(s) may include using a web cryptography application programming interface, such as Web Cryptography API recommended by the World Wide Web Consortium for performing cryptographic operations in web applications including generating and managing keying material (e.g. in cases where the software application is a web browser). In browser-based embodiments, the server computer may deploy software components (e.g. using JavaScript™, a trademark of the Oracle Corporation) to the software application instance to cause the software application instance to generate its own cryptographic key(s) and, in some embodiments, obtain a digital certificate and store this information in the secure storage and enroll the web browser instance with the server computer. This may occur automatically and without direct user intervention.

Obtaining the digital certificate (116) may include requesting the CA (117) to generate and/or sign the digital certificate, for example by the software application instance transmitting a certificate signing request and associated data elements (including the public key) to the CA for generating (e.g. compilation into and signing of) the digital certificate.

The software application instance (118A) stores the cryptographic key(s) and/or digital certificate (if applicable), and any other sensitive data, in the secure storage (120) so as to prevent access to the keys/certificate/other sensitive data by unauthorized applications. This will ensure that only the software application instance (118A) may be able to access and/or use the cryptographic key(s) (e.g. private key) and the cryptographic key(s) will therefore only be known only to the software application instance. In digital certificate-based embodiments, the digital certificate (116) includes the public key and is registered or enrolled with the server computer in association with the software application instance (118A) and user so as to bind the software application instance to the digital certificate (116).

In PKI-based embodiments, the key pair may be stored in the secure storage (120) such that that the private key is unextractable and the public key is extractable. The private key may be stored with configuration for use in signing operations such that data elements can be signed using the private key without the private key actually being retrieved or revealed. The public key may be stored configured for use in verifying operations. The private key and the digital certificate may be used for multiple subsequent sessions between the software application instance (118A) and the server computer (102). In some embodiments, e.g. where the software application is a web browser, the secure storage (120) may be clearable by the user and may for example be automatically cleared by the browser instance operating in a privacy mode after closing the browser instance. This gives a user of the software application instance (118A) control to replace a private key and browser certificate as frequently as they like or in response to a security breach known to the user.

In web browser-based embodiments, the functionality of the secure storage (120) described above may be provided by the Indexed Database API. The private key (116A) and the digital certificate (116) may be stored in the secure storage (120) in association with the network domain (110) and/or the domain name. The storage (120) may be provided by the web browser that is accessible to only the web browser during an active browser session with the network domain and the storage may store the private key with restricted access such that the private key is not extractable from the storage (120).

The cryptographic key(s), digital certificate (116) and certificate identifier, if applicable, are uniquely associated with, and hence bound to, the software application instance (118A) executing on the user device (104). The cryptographic key(s), digital certificate (116) and certificate identifier, if applicable, are uniquely associated with, or linked to, the user at the server computer. In this manner, data received from the software application instance (118A) which has been signed or encrypted using the cryptographic key(s) may be verified by the server computer as data originating from software application instance linked to the user. As the cryptographic key(s) are generated by the software application instance (118A) and involve a high degree of randomness, they may be used to confirm or validate the identify the software application instance (118A) expected to be in the user's possession, so as to indicate a possession factor.

In some implementations, for example browser-based implementations, the cryptographic key(s) (and digital certificate, in applicable implementations) may be created and/or deployed to the software application instance and may be registered or enrolled in association with the user record, and hence the user, without any direct knowledge or intervention on the part of the user. Enrolment may therefore happen in the background without having to request from the user any specific input or action for that purpose. A user's web browser may therefore be assigned cryptographic key(s) and enrolled with the trusted entity without the user actively (and knowingly or consciously) taking steps to do so. This enrolment process is described in the Applicant's co-pending PCT application nos. PCT/IB2020/056525 and PCT/IB2020/056522, the contents of which are incorporated by reference herein in their entirety for all purposes.

The software application may have access to one or more contextual data sources (121), which may include software application configuration files (121A), user files (121B) user device configuration files (121C), system files (121D), network settings (121E), input interfaces (122) (such as one or more of a keyboard, mouse, touch-screen, touch-pad, microphone, camera, accelerometer, gyroscope, manometer, a contactless element, a geolocation element, or the like), output device configuration files (121F) (such as display settings, output device connection statuses, etc.) and the like. The software application may be configured to collect contextual data from the contextual data sources, which may include collection of data points such as one or more of: data points representing, characterizing or otherwise associated with user interaction with the user device by a user; user location; font settings; user interactions with other persons; a device identifier on which the software application is installed; the IP address(es) from which the user device is connecting to the server computer; device identifiers of proximate devices detectable via contactless data element; user type speed; the user's swipe patterns; accelerometer data; type of input interface in use (e.g. touch-screen, keyboard, mouse, etc.); output devices connected to the user device; display resolution; mouse cursor location within the software application instance (or elsewhere); user input characteristics or traits (e.g. copy-paste versus manual input, right click with mouse verses keyboard input, etc.); pixel size of software application; background noise; and the like. The collected contextual data may include behavioural data and may be transmitted to the server computer (102) as an inherence claim (e.g. for establishing whether the user is who he/she claims to be).

Figure 2A:
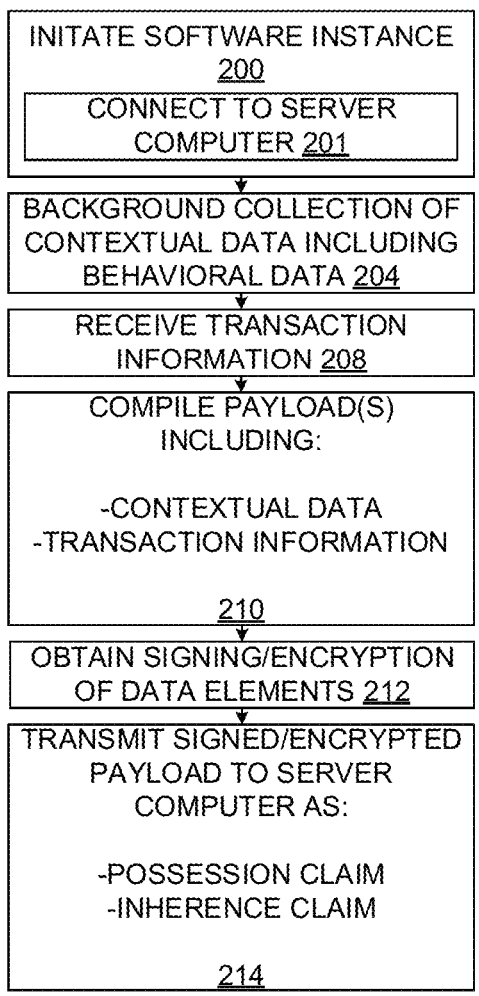
FIG. 2A is a flow diagram which illustrates operations conducted by a software application instance in embodiments of a method for multi-factor authentication according to aspects of the present disclosure.

The system (100) described above may implement a method for multi-factor authentication. An exemplary method for multi-factor authentication conducted at a software application executing on a user device (104) associated with a user and connected to a server computer (102) is illustrated in the flow diagram of FIG. 2A. Corresponding steps, operations or procedures conducted at the server computer (102) are described with reference to FIG. 2B.

The software application instance (118A) may be initiated or launched (200) by the user device (104) in response to a user input or other instruction (e.g. an instruction from another application, etc.). Initiating the software application instance may include the software application instance connecting (201) to the server computer (102) and/or the network domain (110). The user may initiate the software application instance (118A) by, for example, launching the software application (118) on the user device (104). In embodiments in which the software application is a web browser, the software application instance may be initiated upon connection of the web browser to the server computer and/or network domain (e.g. by way of the user inputting the domain name into the web browser).

In some embodiments connecting (201) to the server computer (102) may include the software application instance transmitting an identity claim to the server computer. Transmitting the identity claim may for example include transmitting identifying data, such as one or more of: a software application instance identifier, a digital certificate (116), a public key (116B), a digital certificate identifier (116C), an interaction data element having been received from the server computer and stored by the software application during the last connection, or the like. In some embodiments, transmitting the identity claim may include obtaining signing or encryption of data elements including the identifying data and optionally a random number and/or timestamp to prevent replay of the identity claim.

In some embodiments, the software application instance (118A) may receive a challenge from the server computer (102). The challenge may for example be a cryptographic nonce for signing or encryption and returning to the server computer by the software application instance as a challenge-response. Receiving the challenge may form a part of connecting to the server computer and may be in response to the server computer validating the identity claim. In other embodiments, instead of the server transmitting a challenge, the software application may sign or encrypt data elements such as an interaction data element and a timestamp, just a timestamp, or the like and transmit these signed/encrypted data elements to the server computer for validation as a possession claim.

Connecting (201) to the server computer may be executed at a later stage during the method (at any point prior to transmitting data to the server).

Upon initiation or at certain predefined points in time (e.g. while the user performs a predefined routine task or action), the software application instance (118A) may collect (204) contextual data from one or more contextual data sources (121). The contextual data may include behavioural data. Collection of the contextual data may be performed by the software application instance (118A) in the background and possibly without the user's direct knowledge or intervention. In other words, the contextual data may be collected without the user actively being aware of the collection or being explicitly prompted to provide such data. The contextual data may be collected from components or elements of the user device (104) by means of the software application monitoring or accessing the one or more contextual data sources (121). Collection of contextual data may include collection of data points relating to events. In some cases, collection of data points relating to between seven to ten events (e.g. user input or user interaction events) may be sufficient for the server computer to distinguish a registered user from other users. Other implementations may require data points relating to more or fewer events. Collection of contextual data may thus be limited to collection of data points relating to specific predefined events (or a randomly selected subset of predefined events). In some embodiments, the collection of contextual data may occur at one or more predefined stages, for example upon initiation and/or during the performance of a selection of one or more predefined tasks or actions. The predefined actions may include actions of the user in response to prompts. The actions and prompts may be those that a user is routinely required to perform while interacting with the network domain (some examples of which are listed above). Collection of the contextual data may thus be preceded by outputting a prompt to the user requiring the user to perform some predefined action. Example contextual data collection procedures are described below with reference to FIG. 5.

In embodiments which relate to transaction authentication, optionally while collecting contextual data, the software application instance (118A) may receive (208) transaction information. In the case of a financial transaction, transaction information may for example include one or more of: an amount to be paid, a beneficiary or recipient of the payment, payment source details (such as payment card details), the location where the transaction is being performed, a timestamp of the transaction, a description of the transaction (e.g. a list of products, services relating to the transaction), or the like. The transaction information may be input by the user.

The method may include compiling one or more payloads (210) including one or more of: a challenge received from the server computer, the contextual data, identifying data, an interaction data element, a timestamp, and the transaction information, if applicable. The payloads may be message payloads or other suitable data structures configured for transmission from the software application instance (118A) to the server computer (102) via the communication network (106).

The software application instance (118A) may obtain (212) signing/encryption of data elements including: the one or more payloads; a challenge; identifying data; transaction information; an interaction data element; a timestamp and the like. Obtaining signing/encryption may include using the cryptographic key(s) stored in the secure storage (120) of the software application instance (118A) for exclusive use by the software application instance. In PKI-based implementations in which the cryptographic key(s) include a public key and a private key, obtaining signing or encryption of the payload may include digitally signing or encrypting the payload using the private key which is uniquely associated with the software application instance (118A). In some embodiments obtaining signing/encryption of the payload may include digitally signing the payload using the private key to output signed data for validation by the server computer using the digital certificate (116) and/or corresponding public key. As only the software application instance has access to (or use of) the private key, validation of the signing/encryption using the public key/digital certificate may establish the payload as having originated from the software application instance that is registered or enrolled in association with the user.

The software application instance (118A) may transmit (214) the signed/encrypted data elements (including payload (s), in this embodiment) to the server computer (102) via the communication network (106). The signed/encrypted data elements including payload(s) may be transmitted to the server computer as a possession claim and an inherence claim. The possession claim may be by virtue of the signing/ encryption using cryptographic key(s) to which only the software application instance has access or use. The inherence claim may be by virtue of the contextual data including behavioural data which is unique to the user. In some embodiments, the signed/encrypted payload(s) may be transmitted together with identifying data representing an identity claim (e.g. where this is not done as a part of the connection to the server computer).

In response to validation of the claims by the server, the software application instance may receive an access token for inclusion by the software application instance in subsequent requests, messages, payloads, etc. transmitted to the server during the session.

Figure 2B:
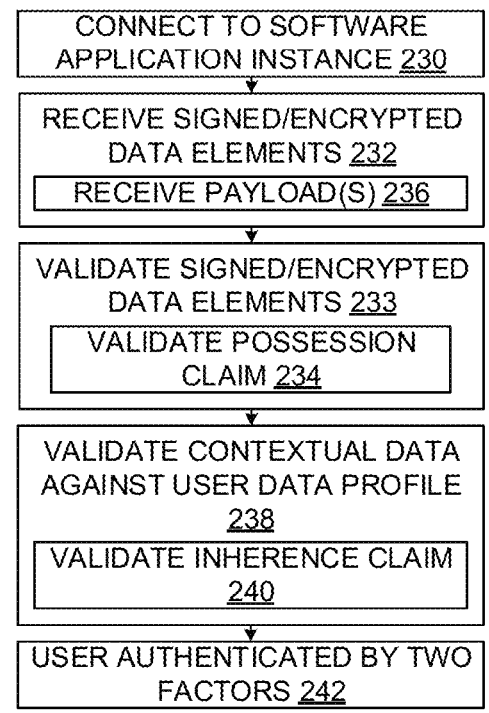
FIG. 2B is a flow diagram which illustrates operations conducted by a server computer in embodiments of a method for multi-factor authentication according to aspects of the present disclosure.

Referring now to FIG. 2B, the method at the server computer (102) includes connecting (230) to the software application instance (118A). In some embodiments, connecting to the software application instance includes establishing a browser based session with the software application instance (in such an embodiment being a browser instance). In some embodiments, connecting to the software application instance includes receiving and validating an identity claim. Validating the identity claim may for example include determining whether identifying data included in the identity claim corresponds to a registered user (e.g. identifying a user record linked to or associated with the identifying data). In some embodiments, the server computer transmits a challenge to the software application instance and receives and validates a challenge-response in the form of signed/encrypted data elements including the challenge. In other embodiments, the server computer may receive and validate signed/encrypted data elements including for example an interaction data element and/or timestamp and the like. Validation of these signed/encrypted data elements may constitute validation of a possession claim.

The method includes receiving (232) signed or encrypted data elements from the software application instance (118A). The signed encrypted data elements may include one or more of: one or more payloads; a challenge; identifying data; transaction information; a timestamp and the like.

The method includes validating (233) the signed or encrypted data elements. This may include accessing a cryptographic key (e.g. public key (116B)) stored in or otherwise associated with the user record (113) and using the cryptographic key to validate the signed/encrypted data elements. This may for example include using the cryptographic key to decrypt the signed/encrypted data elements. Successful decryption may establish the data elements as validated. In cases where a challenge is transmitted, successful validation may require the challenge received to match or correspond to the challenge transmitted. Successful validation of the signed or encrypted data elements may include validating (234) the possession claim (or establishing the possession claim as being valid).

The method may include receiving (236) one or more payloads. In the illustrated embodiment, the data elements include the one or more payloads and receiving the data elements includes receiving the payloads(s). In other embodiments, the payload(s) may be received from the software application instance separately from the data elements.

The method includes validating (238) the contextual data against a user profile (115). This may include performing various operations on the received contextual data to compare and/or contrast it with the data stored in the user profile (115). Validating the contextual data may include using suitable validation algorithms that are configured to find similarities, familiarities, omissions and/or differences between the received contextual data and the data stored in the user profile. Validating the contextual data may include determining whether or the extent to which the contextual data corresponds to the data stored in the user profile. Validating (238) the contextual data against the user profile (115) may include inputting the received contextual data into one or more validation algorithms configured to compare and/or contrast the received contextual data to data stored in the user profile, such as raw and/or processed contextual data points previously received from devices or sessions associated with the user; patterns, discriminators, flags and other metadata derived from raw and/or processed contextual data points, and the like. Validating the contextual data may include determining if (or the extent to which) the received contextual data matches, corresponds or is consistent with or otherwise can be associated with the data stored in the user profile (115). Validating the contextual data may include determining a score or other value indicating the extent to which the received data matches the stored data for comparing to one or more thresholds, ratings or rules. Determining the score may include determining a positively confirming score (e.g. meaning the data points look like they are associated with the user) and a negatively detracting score (e.g. the data points do not look like those with which the user is associated), which scores may be evaluated together by a decisioning algorithm in order to issue an ultimate determination on the validity of the contextual data. Scores above the threshold may be considered 'matches' while scores below the threshold may be considered 'failed matches' and the validation may fail. Validating (238) the contextual data against the user profile may include validating (240) the inherence claim. For example, if the contextual data is determined to be valid, the inherence claim may be determined to be valid and the server computer (102) may determine that the user interacting with the software application (118) is indeed (or is most likely) the user with whom the software application instance (118A) has been registered or enrolled. Validating the inherence claim may include the server computer determining that the user having interacted with the software application instance looks like (or appears to be) the user with whom the software application instance is registered.

Responsive to validation of the possession and inherence claims, the server computer has authenticated (242) the user and/or a transaction by two-factors. The server may transmit an access token to the software application instance.

Figure 3A:
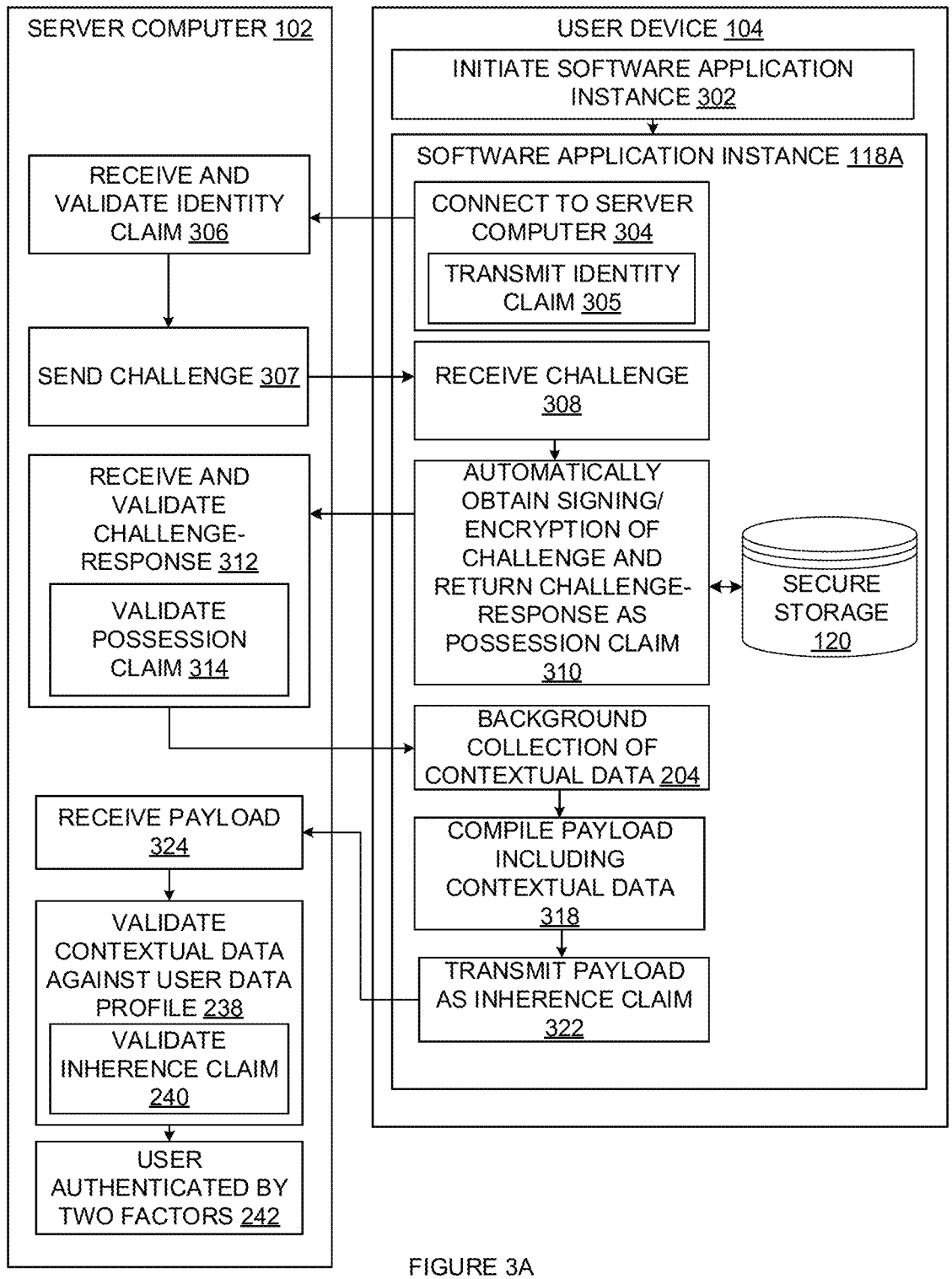
FIG. 3A is a swim-lane flow diagram which illustrates an example embodiment of a method for multi-factor authentication according to aspects of the present disclosure.

Referring to FIG. 3A, a swim-lane flow diagram shows a method for multi-factor authentication according to another example embodiment. In the example embodiment of FIG. 3A, the software application (118) is a web browser installed and executing on a user device (104). The method described with reference to FIG. 3A elaborates on example embodiments described above with reference to FIGS. 2A and 2B.

The software application instance (118A), which in this example embodiment may also be termed a "browser instance", may be initiated (302), for example by the software application connecting (304) to or accessing the server computer (102), e.g. via a domain name identifying the network domain (110).

In the illustrated embodiment, connecting (304) to the server computer (102) includes the software application instance (118A) transmitting (305) an identity claim to the server computer. Transmitting the identity claim in the illustrated embodiment includes transmitting one or more of: the digital certificate (116); public key (116B) and digital certificate identifier (116C). This may include accessing or retrieving the digital certificate, digital certificate identifier and/or public key from the secure storage (120) which, as described above, may be accessible to the software application (118) only during an active browser session with the network domain (110). In other embodiments other identifying data may be transmitted as part of the identity claim. In some embodiments, transmitting the identity claim may include the software application instance obtaining signing or encryption of data elements including the identity claim and optionally a random number and/or timestamp.

The server computer (102) may receive and validate (306) the identity claim. This may include extracting the public key and/or digital certificate identifier from the digital certificate and querying an enrolment database (112) to check if the digital certificate is enrolled and/or to identify the user record (113) associated therewith. Successfully validating the identity claim may include establishing the software application instance as trusted.

The server computer (102) may send (307) a challenge to the software application (302). The software application instance (118A) may receive (308) the challenge and obtain encryption or signing of data elements including the challenge using the cryptographic key(s), in this embodiment being the private key (116A) stored in the secure storage and accessible to or usable by the software application instance only during the active browser session with the server computer. This may include using the Web Cryptography API and the Indexed Database API. The software application instance (118A) may return (310) the signed/encrypted data elements (including the challenge, in this embodiment) to the server computer (102) as a challenge-response and possession claim. In other embodiments, other data elements (such as an interaction data element, a timestamp, a random number, etc.) may be signed/encrypted using the cryptographic key(s) and transmitted to the server computer as a possession claim.

The server computer (102) may receive and validate (312) the signed/encrypted data elements. Validating the signed/encrypted data elements may include decrypting the signed or encrypted data elements using the public key (116B) obtained from the digital certificate (116) or from the user record (113) and, in the illustrated embodiment, comparing a challenge included in the decrypted data elements to the challenge sent to the software application instance. If the decryption is successful and/or if the challenges match, the signed/encrypted data elements (and challenge-response, in this embodiment) may be validated. Validating the signed/encrypted data elements may include the server computer (102) validating (314) the possession claim. In other words, successful validation of the challenge-response may confirm the possession claim as being valid. In other words, the fact that only the software application instance has access to or can use the cryptographic key(s), in this embodiment being the private key, means that only the software application instance could have signed/encrypted the challenge in the manner verifiably by the server using the corresponding cryptographic key (public key, in this embodiment) stored in or in association with the user record. Thus, receipt and validation of the challenge-response by the server computer establishes that the user is in possession of the user device on which the software application instance is installed and hence that the user is in possession of the possession factor. Responsive to validating the possession claim, the server may transmit, and the software application instance may receive, an access token for use during the session with the server. The software application instance may temporarily store the access token for use in transmitting requests and/or data to the server.

From initiation and/or at one or more predefined points in time (e.g. upon prompting a task or action), the software application instance (118A) may collect contextual data (204). As mentioned in the foregoing, the collection of the contextual data may occur in the background and without the user's direct knowledge or input. The contextual data collected may include behavioural data which can be used by the server to validate inherent characteristics of the user, for example by determining whether or not the user is who he or she claims to be or is expected to be (e.g. based on the identity claim already submitted). Collection of the contextual data may thus be preceded by the software application receiving from the server and outputting a prompt to the user requiring the user to perform some predefined action.

In some implementations, the user may input transaction information into the software application instance (118A).

The software application instance (118A) may compile (318) one or more payloads at least including the contextual data and transmit (322) the payload to the server computer (102). The payload may be transmitted to the server computer (102) as an inherence claim. In other words, the payload may represent an inherence claim being submitted by the software application automatically and without direct user intervention. In some embodiments, the payload may include one or more of: transaction information, reason for the authentication request, the challenge, an interaction data element, a timestamp and the like. In some embodiments, the software application may obtain signing or encryption of data elements including the payload using the cryptographic key(s) stored in the secure storage, which signed/encrypted data elements may be transmitted to the server computer. This may inextricably link the possession claim to the inherence claim. In some embodiments, a signed/encrypted payload including inter alia the transaction information, timestamp and the contextual data may represent an authentication code that meets regulatory requirements, such as the dynamic linking requirement imposed by PSD2, for example. The one or more payloads may include an access token received from the server in response to validation of a possession and/or identity claim.

The server computer (102) may receive (324) the payload and validate (238) the contextual data against a user profile (115) associated with the user record (113). Validating (238) the contextual data against the user profile may include validating (240) the inherence claim.

At this stage, the server computer (102), without direct user knowledge or intervention, has received and validated a challenge-response having been signed/encrypted by a cryptographic key of which the enrolled software application instance (118A) has exclusive use (thus representing something the user has) and has received and validated contextual data including behavioural data uniquely associated with the registered user. The server computer (102) has therefore effectively performed (242) two-factor authentication of the user/transaction in a manner that is frictionless (i.e. that involves minimum user cooperation) yet secure.

Figure 3B:
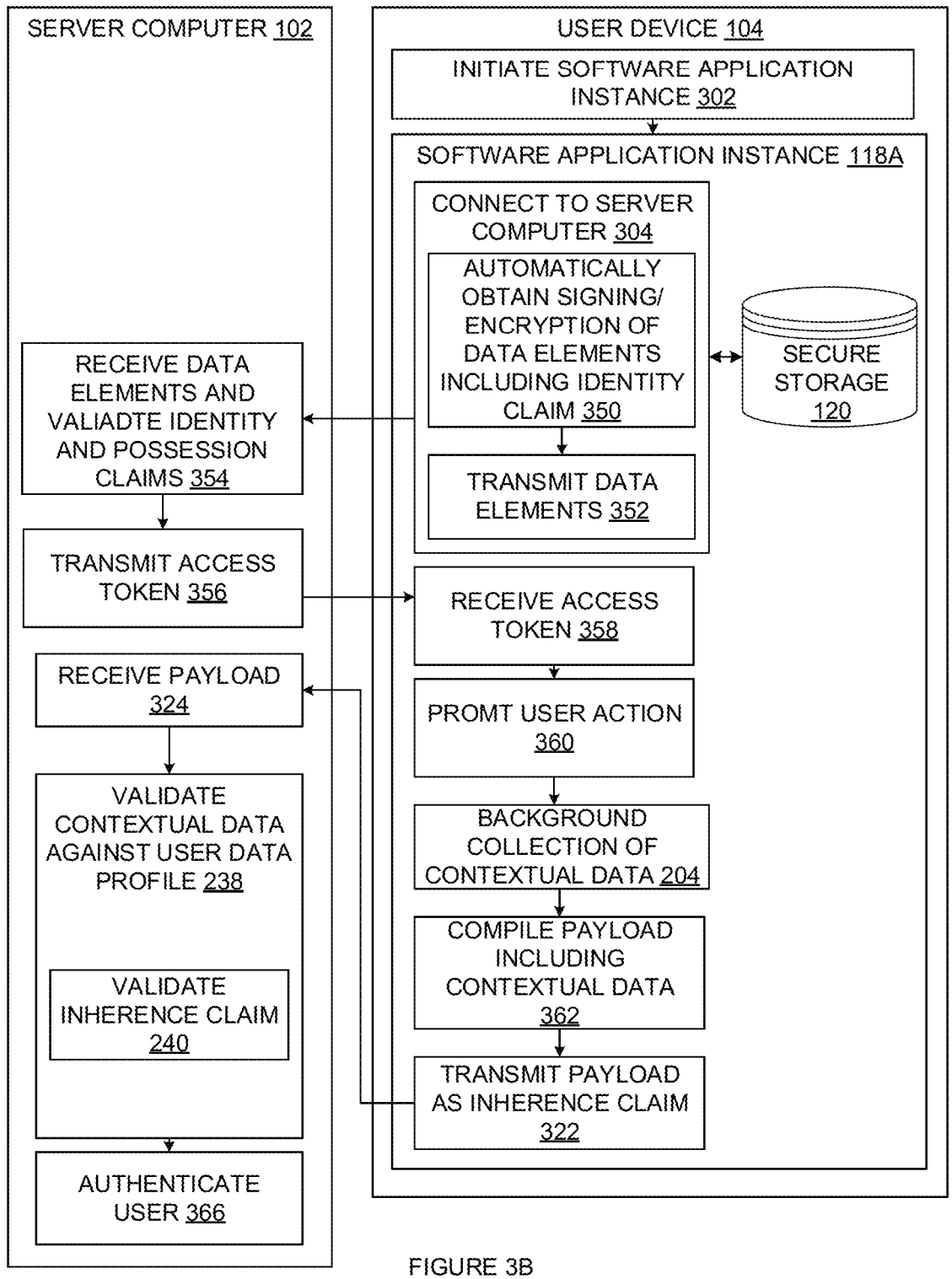
FIG. 3B is a swim-lane flow diagram which illustrates another example embodiment of a method for multi-factor authentication according to aspects of the present disclosure.

Referring to FIG. 3B, a swim-lane flow diagram shows a second example embodiment of a method for multi-factor authentication. Like features are indicated by like reference numerals.

The software application instance (118A) may be initiated (302), for example by the software application connecting (304) to or accessing the server computer (102).

In some embodiments, connecting (304) to the server computer (102) may include the software application instance (118A) automatically obtaining (350) signing or encryption of data elements including identifying data. The signing/encryption uses the cryptographic key(s), in this embodiment being the private key (116A), stored in the secure storage and accessible to or usable by the software application instance only during the active browser session with the server computer. The software application instance (118A) may transmit (352) the signed or encrypted data elements as an identity claim (by virtue of the identifying data) and as a possession claim (by virtue of the signing/encryption using the cryptographic key) to the server computer (102) for validation.

The server computer (102) may receive the data elements and validate (354) the identity and possession claims (e.g. as described in the foregoing).

In response to validating the possession and identity claims, the server computer (102) may transmit (356) an access token to the software application instance (118A). The access token may be a unique token configured to identify that a particular software instance has been initiated. For example, the access token may include a unique identifier associated with the initiated software application instance.

The software application instance (118A) may receive (358) the access token and may temporarily store it for use in the session with the server.

At some stage, the server may transmit, and the software application instance may output, a prompt (360) to a user of the user device (104) to perform one or more predefined actions.

Responsive to the prompt, the software application instance (118A) may collect contextual data (204) in the background. As mentioned in the foregoing, the contextual data collected may include behavioural data which can be used by the server to validate inherent characteristics of the user, for example by determining whether or not the user is who he or she claims to be or is expected to be (e.g. based on the identity claim already submitted).

The software application instance (118A) may compile (362) one or more payloads at least including the contextual data and transmit (322) the payloads to the server computer (102). The payloads may be transmitted to the server computer (102) as an inherence claim. In the present embodiment the payload may also include the access token, e.g. to identify to the server that the software application instance (118A) having collected the contextual data is the same software application instance for which identity and possession claims have already been validated.

The server computer (102) may receive (324) the payload and validate (238) the contextual data against a user profile (115) associated with the user record (113). Validating (238) the contextual data against the user profile may include validating (240) the inherence claim and the access token. Upon validating the contextual data and the access token the server computer may authenticate (366) the user.

Figure 4:
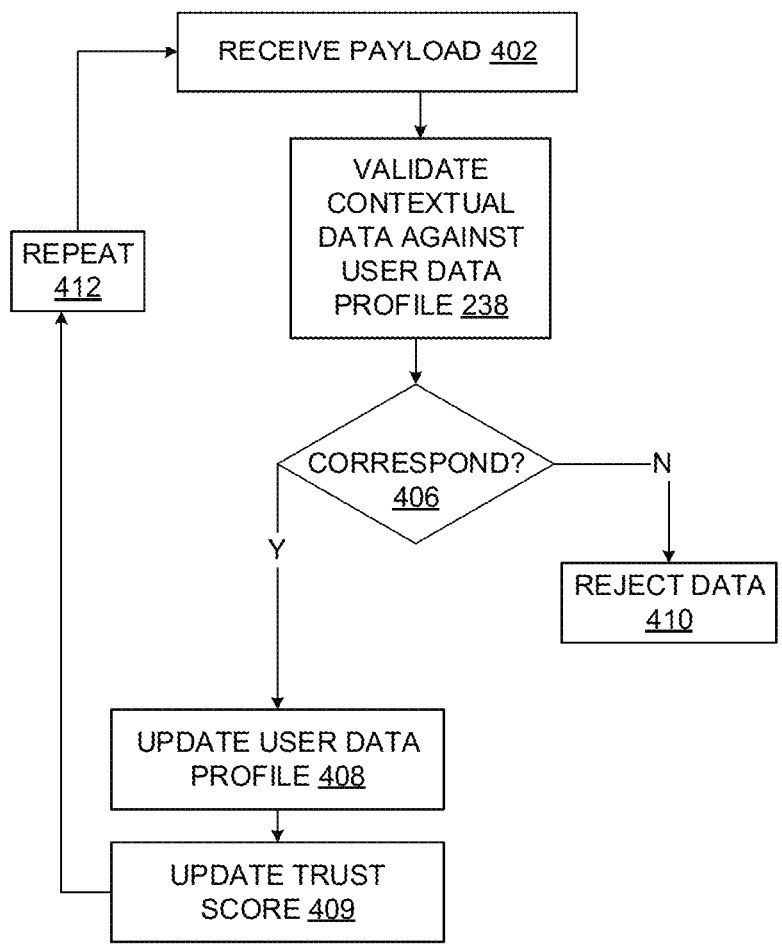
FIG. 4 is a flow diagram which illustrates an example method for maintaining a user profile according to aspects of the present disclosure.

FIG. 4 is a flow diagram which illustrates an example method for user profile maintenance according to aspects of the present disclosure. The method may be conducted by a server computer (102) and may be triggered or executed each time a registered user interacts with the server computer via an enrolled software application instance (118A). The method may thus form a part of the above described methods for multi-factor authentication.

The method includes receiving (402) a payload including contextual data. The payload is received from an enrolled software application instance and is associated with a registered user. The contextual data includes behavioural data obtained by monitoring a user's interaction with the software application instance. The payload may be signed and/or encrypted using a cryptographic key of which only the enrolled software application instance has use. The method includes (238) validating the contextual data against a user profile (115) associated with the registered user. Validating the contextual data may include determining whether the contextual data corresponds to the data stored in the user profile. If (406) the contextual data corresponds, the method may include updating (408) the user profile (115) to include the contextual data or data based on the contextual data. The method may also include updating (409) a session trust score indicating the extent to which the contextual data indicates that the user interacting with the software application instance is the registered user. The trust score may reflect a confidence measure, with a high trust score indicating a high degree of confidence that the user interacting with the software application instance (and hence the server computer) is indeed the registered user while a low trust score may indicate a low degree of confidence suggesting that another user (and not the registered user) is interacting with the software application. Updating the trust score may include increasing or decreasing the trust score based on the extent to which the contextual data corresponds to the data stored in the user profile. Otherwise, if (406) the contextual data does not correspond, the method may include rejecting (410) or otherwise discarding of the contextual data. In some implementations, the method may repeat (412) during the course of a session, with the software application instance continually compiling and sending payloads and the server computer continually evaluating the contextual data in the payloads and updating the trust score accordingly.

Figure 5:
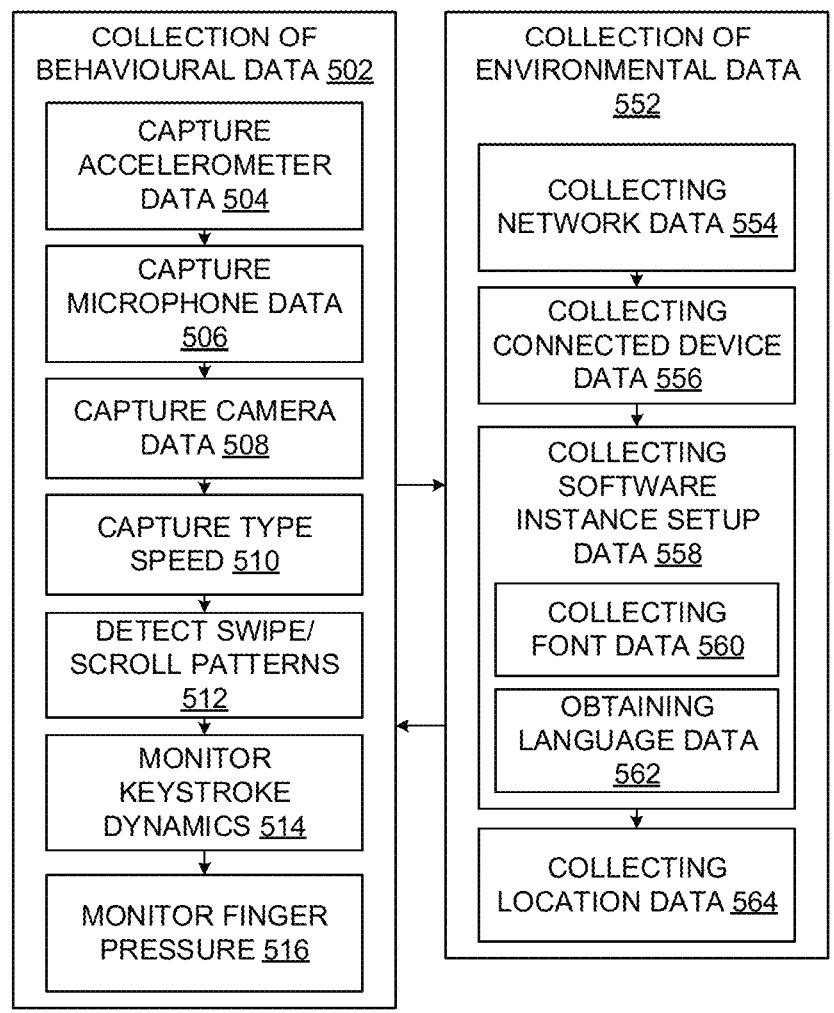
FIG. 5 is a flow diagram which illustrates example operations performed in collecting contextual data according to aspects of the present disclosure.

FIG. 5 is a flow diagram which illustrates the collection (204) of contextual data according to aspects of the present disclosure. The collection of contextual data may include the collection of behavioural data (502) and the collection of environmental data (552) which describes the software application instance environment (including physical environment and the configuration/setup environment). It should be appreciated that the steps or operations illustrated in FIG. 5 are not intended to occur in any particular order and may in fact occur simultaneously or substantially simultaneously. Some or all of the operations (e.g. behavioural data collection) may also be ongoing so as to effect continual collection of contextual data. The contextual data may be collected via one or more contextual data sources (121).

The behavioural data may be collected (502) by one or more input interfaces (122) of the user device (104) and may be usable in generating a behavioural biometric profile associated with the user and by way of which the user can be authenticated.

An example of an interface from which the behavioural data may be collected includes an accelerometer. Accelerometer data may be captured (504) in order to determine a pattern in which the user may generally hold or tilt or move the user device (104) while interacting with the software application instance.

Another example of an input interface which may be used to capture behavioural data includes the device microphone. Capturing (506) microphone data may be useful in determining if the same user is present over multiple uses of the software application. The microphone data could for example be used to flag certain words or phrases often used by the user during a software application.

The collection of behavioural data may further include capturing (508) camera data. The camera of the device may be used to capture user specific data by means of retinal scans or face recognition. Camera data captured over initiation of a plurality of software applications may, for example, be compared in order to determine facial characteristics of the user and with high certainty predict if it is the registered user in use of the device (104).

Further examples of data which may be collected using the one or more input interfaces (122), such as a keyboard, mouse, touchpad and/or touch screen, of the device (104) include capturing (510) type speed data, detecting (512) common swipe or scroll patterns, monitoring (514) key stroke dynamics and monitoring (516) finger pressure.

Capturing (510) type speed data may include determining data points relating to words or characters input per minute, determining data points relating to an average amount of words or letters input by the user while using the software application. In some embodiments this may include identifying common words used in the making of transactions and identifying the speed at which such common words are provided.

Detecting (512) common swipe/scroll patterns may, for example, include determining data points relating to how the user scrolls including, for example, the input interface used to scroll (such as scroll wheel, dragging the side bar, using the up/down buttons, using page up/page down, swiping via touch screen interface, etc.), determining data points relating to angles at which user swipes (e.g. bottom left to top right, or straight up, or bottom right to top left, etc.), determining data points relating to how the user swipes his finger/scrolls on the device to keep the device from entering sleep mode, determining data points relating to any specific swipe or mouse movement patterns input by the user during loading or other idle times (e.g. subconscious inputs while the user is waiting).

Monitoring (514) keystroke dynamics may for example include determining data points relating to time periods between pressing and releasing a key on the keypad/keyboard, time periods between different key presses (in some cases as compared to other combinations or key presses, such as the time between entering the character 't' and 'h' versus the time to enter the character 'h' and 'e', etc.) and the like.

Monitoring (516) finger pressure may, for example, include monitoring the pressure at which the keys are being pressed when typing, respectively (where an appropriate touch screen is available).

It should be appreciated that the above input interfaces and associated behavioural data are examples only and any other suitable behavioural data obtainable from any suitable input interface of the user device and/or software application may be used.

Environmental data may be captured (552) from contextual data sources including configuration files (121A, 121C), user files (121B), system files (121D) network settings (121E), output device configuration files (121F) input interfaces (such as geolocation element, contactless element, etc) and the like.

Collecting environment data may include collecting (554) network data such as one or more of: cellular network connectivity data (e.g. cell tower identifier, cell signal strength, etc.), internet protocol (IP) connectivity data (e.g. IP address, etc.), and wireless communication network connectivity data (e.g. one or SSIDs within range, an IP address, signal strength, etc.) and the like.

Collecting environment data may include collecting (556) data relating to the usage of the contactless element, such as information relating to devices which are within wireless range of the contactless element and to which the device (104) has previously been connected, and the like.

Collecting environment data may include collecting (558) software application setup data. Obtaining the software application setup data may include obtaining (560) font data, such as which font the user prefers when interacting with the software application, the size of the font, etc., and obtaining (562) language data, such as the language setting of the software application, or the input language provided by the user.

Collecting environment data may include collecting (564) location data such as the geographical location of the user device. The geographical location may be broad (e.g. in a particular country) or specific (e.g. in a particular retail store). The location data may be a current geographical location (which may be timestamped) or a geographical location history (with individual timestamps to date different locations).

Environmental data may therefore be obtained from a number of differing elements provided by the user device (104) and/or software application instance. The above-described data points are exemplary and other data points obtainable from any suitable sources of the user device and/or software application instance may be used. Generally, contextual data may be usable in describing or may otherwise relate to one or more contexts in which the user device is present.

Figure 6:
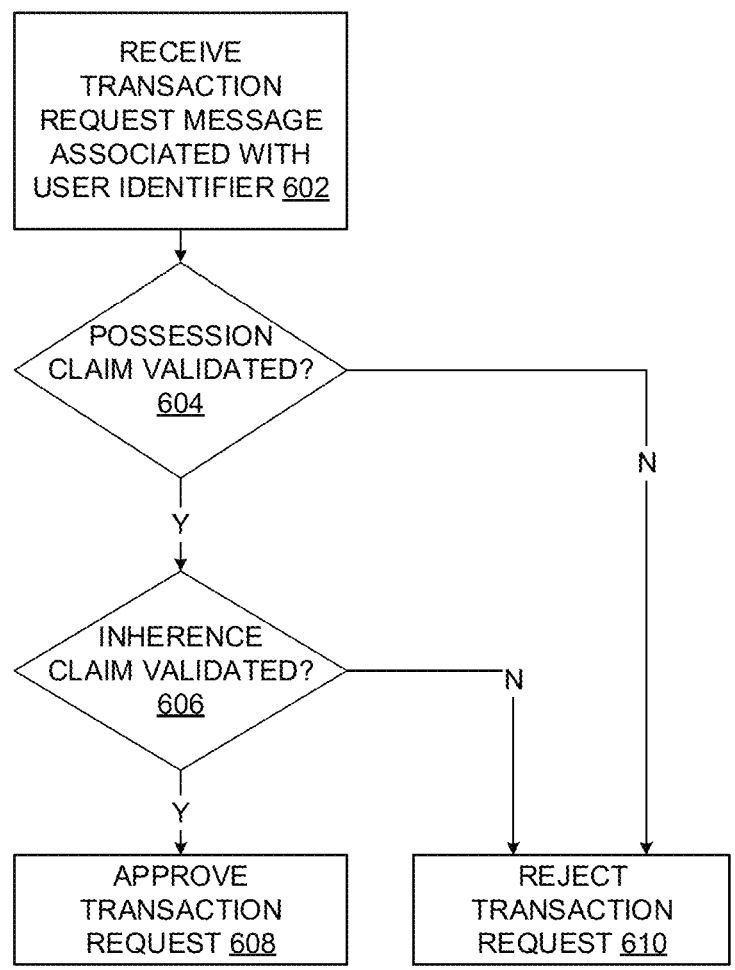
FIG. 6 is a flow diagram which illustrates an example method for approving or denying a transaction request according to aspects of the present disclosure.

FIG. 6 is a flow diagram which illustrates an exemplary method for approving or rejecting a transaction request according to aspects of the present disclosure. The method may be conducted at the server computer (102). A user may submit a transaction request via a software application instance executing on a user device accessible to the user. The user may for example launch or initiate the software application instance (e.g. by opening a web browser and navigating to a network domain of the server computer using a domain name). The initiation may trigger an embodiment of the multi-factor authentication methods described in the foregoing. These multi-factor authentication methods may perform two factor authentication of the user. The multi-factor authentication may be conducted without the user actively or consciously inputting any authentication factors. For example, the user may simply enter the domain name and navigate to a particular page of interest (e.g. pay beneficiary). The identity claim submitted as part of the connection to the remote server may be used by the server computer to load the user's online profile based on the user record, such that information personal to the user can be displayed (e.g. a list of beneficiaries previously loaded by the user). While the user navigates to this page, selects the beneficiary and enters payment information, data points collected via background collection of contextual data may be compiled into one or more payloads and transmitted to the server computer. These payloads may be transmitted as an inherence claim. In some implementations, the payloads may be signed/encrypted using a cryptographic key to which only the software application instance has access, in which case the payloads represent a possession claim too. In other implementations, other data elements are so signed/encrypted for submission as the possession claim. It should be appreciated at this point that the user has not entered a username, has not entered a password, and has not had to pick up another device for multi-factor authentication. Yet, the server computer has received an inherence claim and a possession claim and for validation and multifactor authentication of the user while the user transacts. The user uses the software application instance to transmit a transaction request message (e.g. pay beneficially "Bob" the amount of USD25). The possession claim and inherence claim may be validated by the server computer as described in the foregoing. The method may include receiving (602) the transaction request message including or otherwise associated with identifying data and/or an access token. The transaction request may be any transaction request such as logging into an account, interacting with an account, making a financial payment and the like. The method may include establishing if (604) a possession claim has been validated. This may include querying whether or not the access token is associated with a validated possession claim. If the possession claim has been validated, the method may include establishing if (606) an inherence claim has been validated. This may include querying whether or not the access token is associated with a validated inherence claim. In the event that both the possession claim and the inherence claim have been validated, the transaction request may be approved (608). Should at least one of the inherence claim or the possession claim not have been validated, the transaction may be rejected (610). In some implementations, if the inherence claim has not yet been validated (e.g. if more contextual data is required to make the decision) by the time the user submits the transaction, the method may include transmitting an out-of-band transaction authentication request (e.g. by transmitting an authentication request to a banking application enrolled in association with the user, sending an OTP in an SMS message to the user's mobile phone, sending an OTP to an email address registered in association with the user, or the like).

Figure 7:
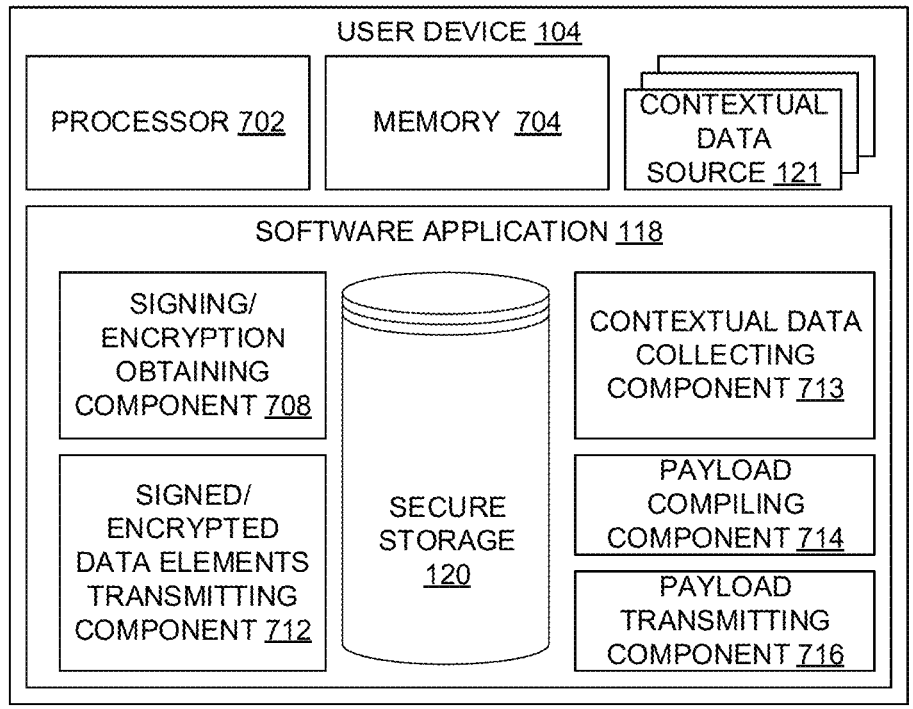
FIG. 7 is a block diagram which illustrates exemplary components which may be provided by a system for multi-factor authentication according to aspects of the present disclosure; and, FIG. 8 illustrates an example of a computing device in which various aspects of the disclosure may be implemented.
Figure 7:
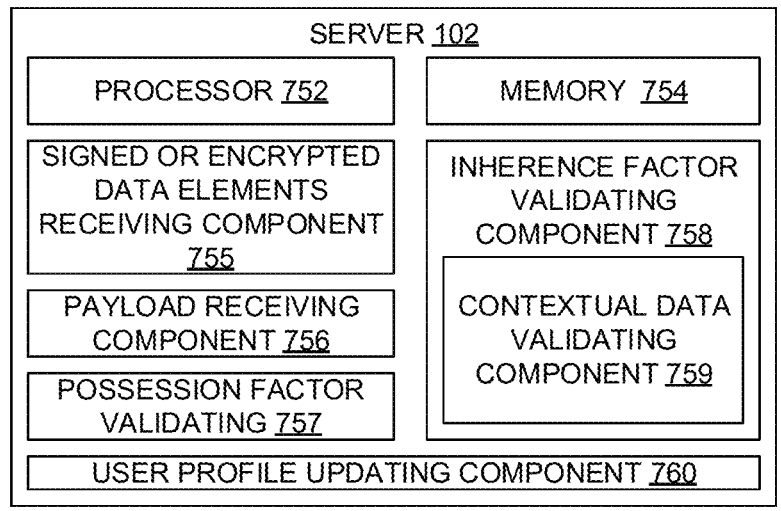

Various components may be provided for implementing the methods described above with reference to FIGS. 2 to 6. FIG. 7 is a block diagram which illustrates exemplary components which may be provided by a system including a user device (104) and a server computer (102) for multi-factor authentication.

The user device (104) may include a processor (702) for executing the functions of components described below, which may be provided by hardware or by software units executing on the user device (104). The software units may be stored in a memory component (704) and instructions may be provided to the processor (702) to carry out the functionality of the described components. In some cases, for example in a cloud computing implementation, software units arranged to manage and/or process data on behalf of the user device (104) may be provided remotely. Some or all of the components may be provided by a software application (118) downloadable onto and executable on the user device (104). As mentioned above, the specific software application installed on a particular user device is termed a software application instance.

The software application (118) may include a signing/encryption obtaining component (708) arranged to obtain signing or encryption of a set of data elements. The signing/encryption obtaining component may be arranged to interface with a secure storage (120) and to use a cryptographic key securely stored therein for the signing/encryption process. The cryptographic key may be stored in the secure storage for exclusive use by the software application instance. In some embodiments, the cryptographic key may be a private key associated with a digital certificate which includes a public key corresponding to the private key. The digital certificate may be enrolled at the server computer in association with the user and include a unique identifier.

The software application (118) may include a signed/encrypted data element transmitting component (712) arranged to transmit the signed/encrypted data elements to the server computer (102) for validation thereat.

The software application (118) may include a contextual data collecting component (713) arranged to collect contextual data from one or more contextual data sources (121). The contextual data collected may include behavioural data and may occur in the background.

The software application (118) may include a payload compiling component (714) arranged to compile a payload at least including the contextual data.

The software application (118) may include a payload transmitting component (716) arranged to transmit the payload to the server computer (102) for validation of the contextual data by the server computer (102).

The server computer (102) may include a processor (752) for executing the functions of components described below, which may be provided by hardware or by software units executing on the server computer (102). The software units may be stored in a memory component (754) and instructions may be provided to the processor (752) to carry out the functionality of the described components. In some cases, for example in a cloud computing implementation, software units arranged to manage and/or process data on behalf of the server computer (102) may be provided remotely.

The server computer (102) may include a signed or encrypted data elements receiving component (755) for receiving signed or encrypted data elements from the software application. The signed or encrypted data elements represent a possession factor and may have been obtained by the software application using a cryptographic key securely stored for exclusive use by the software application.

The server computer (102) may include a payload receiving component (756) arranged to receive a payload including contextual data. The contextual data may include behavioural data having been collected by the software application and representing an inherence factor.

The server computer (102) may include a possession factor validating (757) component for validating the possession factor. This may include validating the signed or encrypted data elements using a corresponding cryptographic key associated with the software application.

The server computer (102) may include an inherence factor validating component (758) for validating the inherence factor including validating the contextual data against a user profile associated with the software application. The inherence factor validating component (758) may include a contextual data validating component (759) for validating the contextual data received against a user profile.

The server computer (102) may include a user profile updating component (760) arranged to update a user profile based on the continually collected contextual data. The user profile may include a user trust score associated therewith. Updating the user profile may include updating the trust score which may be used to determine if the contextual data included in the received payload may be accepted or rejected.

Figure 8:
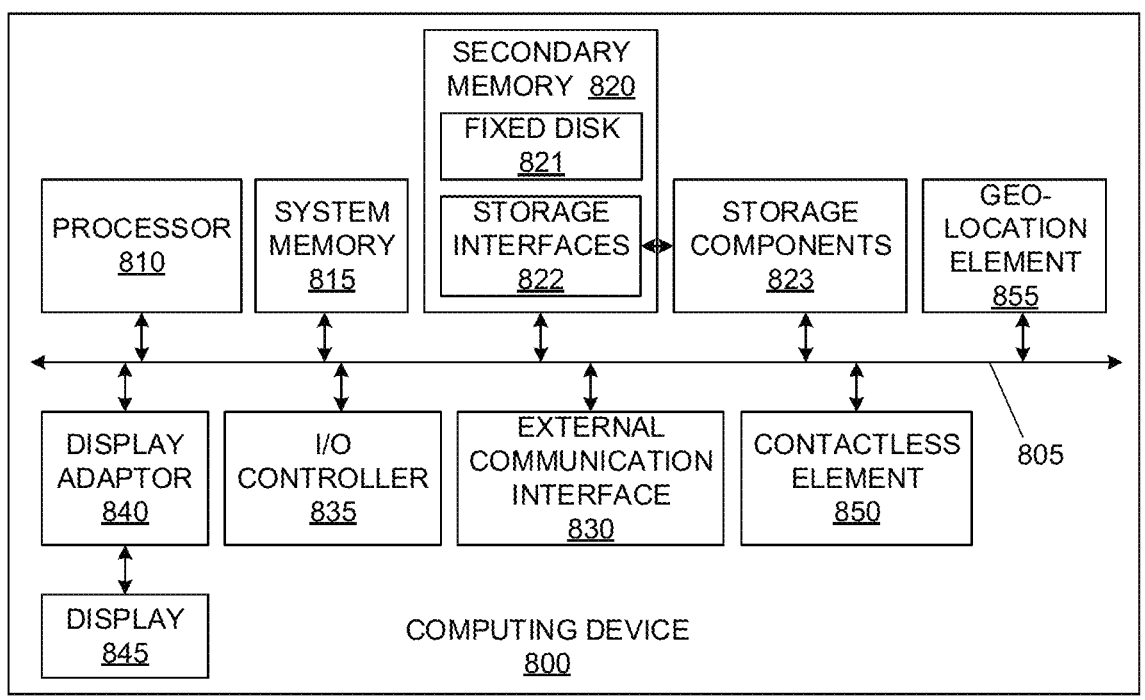

FIG. 8 illustrates an example of a computing device (800) in which various aspects of the disclosure may be implemented. The computing device (800) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (800) may be suitable for storing and executing computer program code. The various participants and elements in the previously described system diagrams may use any suitable number of subsystems or components of the computing device (800) to facilitate the functions described herein. The computing device (800) may include subsystems or components interconnected via a communication infrastructure (805) (for example, a communications bus, a network, etc.). The computing device (800) may include one or more processors (810) and at least one memory component in the form of computer-readable media. The one or more processors (810) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (800) may be distributed over a number of physical locations (e.g. in a distributed, cluster or cloud-based computing configuration) and appropriate software units may be arranged to manage and/or process data on behalf of remote devices.

The memory components may include system memory (815), which may include read only memory (ROM) and random access memory (RAM). A basic input/output system (BIOS) may be stored in ROM. System software may be stored in the system memory (815) including operating system software. The memory components may also include secondary memory (820). The secondary memory (820) may include a fixed disk (821), such as a hard disk drive, and, optionally, one or more storage interfaces (822) for interfacing with storage components (823), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (800) may include an external communications interface (830) for operation of the computing device (800) in a networked environment enabling transfer of data between multiple computing devices (800) and/or the Internet. Data transferred via the external communications interface (830) may be in the form of signals, which may be electronic, electromagnetic, optical, radio, or other types of signal. The external communications interface (830) may enable communication of data between the computing device (800) and other computing devices including servers and external storage facilities. Web services may be accessible by and/or from the computing device (800) via the communications interface (830).

The external communications interface (830) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry. The external communications interface (830) may include a subscriber identity module (SIM) in the form of an integrated circuit that stores an international mobile subscriber identity and the related key used to identify and authenticate a subscriber using the computing device (800). One or more subscriber identity modules may be removable from or embedded in the computing device (800).

The external communications interface (830) may further include a contactless element (850), which is typically implemented in the form of a semiconductor chip (or other data storage element) with an associated wireless transfer element, such as an antenna. The contactless element (850) may be associated with (e.g., embedded within) the computing device (800) and data or control instructions transmitted via a cellular network may be applied to the contactless element (850) by means of a contactless element interface (not shown). The contactless element interface may function to permit the exchange of data and/or control instructions between computing device circuitry (and hence the cellular network) and the contactless element (850). The contactless element (850) may be capable of transferring and receiving data using a near field communications capability (or near field communications medium) typically in accordance with a standardized protocol or data transfer mechanism (e.g., ISO 14443/NFC). Near field communications capability may include a short-range communications capability, such as radio-frequency identification (RFID), Bluetooth™, infra-red, or other data transfer capability that can be used to exchange data between the computing device (800) and an interrogation device. Thus, the computing device (800) may be capable of communicating and transferring data and/or control instructions via both a cellular network and near field communications capability.

The computer-readable media in the form of the various memory components may provide storage of computer-executable instructions, data structures, program modules, software units and other data. A computer program product may be provided by a computer-readable medium having stored computer-readable program code executable by the central processor (810). A computer program product may be provided by a non-transient or non-transitory computer-readable medium, or may be provided via a signal or other transient or transitory means via the communications interface (830). Interconnection via the communication infrastructure (805) allows the one or more processors (810) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (800) either directly or via an I/O controller (835). One or more displays (845) (which may be touch-sensitive displays) may be coupled to or integrally formed with the computing device (800) via a display or video adapter (840).

The computing device (800) may include a geographical location element (855) which is arranged to determine the geographical location of the computing device (800). The geographical location element (855) may for example be implemented by way of a global positioning system (GPS), or similar, receiver module. In some implementations the geographical location element (855) may implement an indoor positioning system, using for example communication channels such as cellular telephone or Wi-Fi™ networks and/or beacons (e.g. Bluetooth™ Low Energy (BLE) beacons, iBeacons™, etc.) to determine or approximate the geographical location of the computing device (800). In some implementations, the geographical location element (855) may implement inertial navigation to track and determine the geographical location of the communication device using an initial set point and inertial measurement data.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient or non-transitory computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Some portions of this description describe the embodiments of the invention in terms of algorithms and symbolic representations of operations on information. These algorithmic descriptions and representations, such as accompanying flow diagrams, are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention set forth in any accompanying claims.

Finally, throughout the specification and any accompanying claims, unless the context requires otherwise, the word 'comprise' or variations such as 'comprises' or 'comprising' will be understood to imply the inclusion of a stated integer or group of integers but not the exclusion of any other integer or group of integers.

What is claimed is:

1. A computer implemented method for multi-factor authentication conducted at a software application executing on a user device associated with a user and connected to a server computer, the method comprising:
   obtaining signing or encryption of a set of data elements using a cryptographic key securely stored for exclusive use by the software application and transmitting the signed or encrypted data elements to the server computer without requiring entry of a password;
   transmitting, to the server computer, a payload including contextual data which includes behavioural data collected via one or more contextual data sources, wherein the signed data elements represent a possession factor and the payload including contextual data represents an inherence factor for validation and multi-factor authentication by the server computer; and,
   in response to validation of the possession and inherence factors by the server computer and authentication of the user by these two factors, receiving an access token from the server computer.

2. The method as claimed in claim 1, including collecting the contextual data by the software application during defined or routine tasks carried out at the user device during an interaction with the server computer.

3. The method as claimed in claim 2, wherein the software application accesses contextual data sources of the user device including one or more input interfaces.

4. The method as claimed in claim 1, wherein the cryptographic key is securely stored in a secure portion of a memory of the user device which provides secure storage for the software application by protecting the secure portion from access by other applications executing on the user device and from external access.

5. The method as claimed in claim 1, wherein the signed or encrypted set of data elements includes the payload and wherein transmitting the payload to the server computer includes transmitting the signed or encrypted set of data elements including the payload to the server computer.

6. The method as claimed in claim 1, including: receiving a challenge from the server computer in response to the software application connecting to the server computer, wherein one or both of the set of data elements and the payload include the challenge.

7. The method as claimed in claim 1, including: receiving transaction information relating to a transaction and including the transaction information in one or both of the set of data elements and the payload.

8. The method as claimed in claim 1, wherein the cryptographic key is securely stored for exclusive use by the software application while the software application is connected to the server computer.

9. The method as claimed in claim 1, wherein the cryptographic key is generated by the software application and uniquely associated with the software application.

10. The method as claimed in claim 1, wherein the cryptographic key is a private key having a corresponding public key accessible to the server computer, and wherein the private key is associated with a digital certificate including the public key and a unique identifier that is enrolled at the server computer in association with the user.

11. The method as claimed in claim 1, wherein the signed or encrypted data elements and the payload are transmitted to the server computer without user intervention.

12. The method as claimed in claim 1, including continually collecting contextual data for periodically compiling into additional payloads.

13. A computer implemented method for multi-factor authentication carried out at a server computer connected to a software application executing on a user device associated with a user, the method comprising:
   receiving, from the software application, signed or encrypted data elements, the signed or encrypted data elements representing a possession factor and having been obtained by the software application using a cryptographic key securely stored for exclusive use by the software application without requiring entry of a password;
   receiving a payload including contextual data which includes behavioural data collected by the software application and representing an inherence factor;
   validating the possession factor including validating the signed or encrypted data elements using a corresponding cryptographic key associated with the software application;
   validating the inherence factor including validating the contextual data against a user profile associated with the software application; and,
   in response to validation of the possession and inherence factors by the server computer and authentication of the user by these two factors, transmitting an access token from the server computer to the software application.

14. The method as claimed in claim 13, including: storing raw or processed contextual data in a user profile associated with a software application instance at a user device, wherein validating the contextual data compares received contextual data to the stored raw or processed contextual data; and, updating the raw and/or processed contextual data in a user profile with received contextual data that is validated against the user profile.

15. The method as claimed in claim 13, wherein validating the contextual data against a user profile includes providing a session trust score indicating the extent to which the received contextual data indicates that the user interacting with the software application is an enrolled user.

16. A system for multi-factor authentication including a software application executing on a user device associated with a user and connectable to a server computer, the user device having a memory for storing computer-readable program code and a processor for executing the computer-readable program code, the user device comprising:
   a signature/encryption obtaining component for obtaining signing or encryption of a set of data elements using a cryptographic key securely stored for exclusive use by the software application and transmitting the signed or encrypted data elements to the server computer without requiring entry of a password;
   a payload transmitting component for transmitting, to the server computer, a payload including contextual data which includes behavioural data collected via one or more contextual data sources,
   wherein the signed data elements represent a possession factor and the payload including contextual data represents an inherence factor for validation and multi-factor authentication of the user by the server computer; and,
   a token receiving component for, in response to validation of the possession and inherence factors by the server computer and authentication of the user by these two factors, receiving an access token from the server computer.

17. The system as claimed in claim 16, wherein the server computer is connectable to the software application executing on the user device, and has a memory for storing computer-readable program code and a processor for executing the computer-readable program code, the server computer comprising:
- a signed or encrypted data elements receiving component for receiving, from the software application, signed or encrypted data elements, the signed or encrypted data elements representing a possession factor and having been obtained by the software application using a cryptographic key securely stored for exclusive use by the software application;
- a payload receiving component for receiving a payload including contextual data which includes behavioural data collected by the software application and representing an inherence factor;
- a possession factor validating component for validating the possession factor including validating the signed or encrypted data elements using a corresponding cryptographic key associated with the software application; and,
- an inherence factor validating component for validating the inherence factor including validating the contextual data against a user profile associated with the software application.

18. The system as claimed in claim 16, wherein the user device includes a payload compiling component for compiling a payload including the contextual data collected by the software application from one or more contextual data sources including an input interface of the user device during defined or routine tasks carried out at the user device during an interaction with the server computer.

19. The system as claimed in claim 16, wherein the cryptographic key is securely stored in a secure portion of a memory of the user device which provides secure storage for the software application by protecting the secure portion from access by other applications executing on the user device and from external access.

* * * * *